United States Patent [19]

Burke

[11] Patent Number: 5,479,285
[45] Date of Patent: Dec. 26, 1995

[54] LIQUID CRYSTAL DEVICE WITH AN ISOTROPIC SHOCK MOUNTING AND GASKET

[75] Inventor: Randal A. Burke, Sugar Hill, Ga.

[73] Assignee: NCR Corporation, Dayton, Ohio

[21] Appl. No.: 115,295

[22] Filed: Sep. 1, 1993

[51] Int. Cl.$^6$ ................................................. G02F 1/1333
[52] U.S. Cl. .............................. 359/83; 359/62; 361/681; 248/638; 312/223.2
[58] Field of Search .................... 359/83, 80, 62; 174/52.1, 65 R; 361/681, 536, 537; 312/223.1, 223.2; 248/917, 604, 613, 638, 560; 267/153, 152, 361; 6/35 R

[56] References Cited

U.S. PATENT DOCUMENTS

| | | | |
|---|---|---|---|
| 3,952,152 | 4/1976 | Lill et al. | 348/821 |
| 4,063,289 | 12/1977 | Veenendaal | 348/836 |
| 4,246,613 | 1/1981 | Choder et al. | 348/819 |
| 4,381,421 | 4/1983 | Coats et al. | 174/35 R |
| 4,614,404 | 9/1986 | Motoi | 359/83 |
| 4,652,932 | 3/1987 | Miyajima et al. | 359/83 |
| 4,831,211 | 5/1989 | McPherson et al. | 174/35 R |
| 4,898,555 | 2/1990 | Sampson | 445/22 |
| 4,958,889 | 9/1990 | Boyle et al. | 248/188.6 |
| 4,979,636 | 12/1990 | Daly | 174/65 R |
| 5,002,368 | 3/1991 | Anglin | 359/83 |
| 5,021,763 | 6/1991 | Obear | 174/65 R |
| 5,036,313 | 7/1991 | Lin et al. | 361/736 |
| 5,084,757 | 1/1992 | Leo et al. | 348/825 |
| 5,145,434 | 9/1992 | Pauplis et al. | 445/23 |
| 5,150,231 | 9/1992 | Iwamoto et al. | 359/44 |
| 5,164,542 | 11/1992 | Hart | 174/35 R |
| 5,182,660 | 1/1993 | Tanaka | 359/83 |
| 5,243,453 | 9/1993 | Kawagishi et al. | 359/83 |
| 5,363,277 | 11/1994 | Ichikawa et al. | 359/83 |
| 5,422,751 | 6/1995 | Lewis et al. | 359/83 |
| 5,432,626 | 7/1995 | Sasuga et al. | 359/83 |

FOREIGN PATENT DOCUMENTS

| | | | |
|---|---|---|---|
| 2084617 | 3/1990 | Japan | 359/83 |
| 5100215 | 4/1993 | Japan | 359/83 |

*Primary Examiner*—Anita Pellman Gross
*Assistant Examiner*—Kenneth Parker
*Attorney, Agent, or Firm*—Albert L. Sessler, Jr.

[57] ABSTRACT

An isotropic shock mounting to prevent damage to electronic components such as a display mounted in a hand-held signature capture terminal includes a shock gasket which extends around the edges of the display, a carrier in which the display is disposed, a formed metal bezel within which the carrier fits having a cut-out portion through which the display can be viewed, and a plurality of shock grommets positioned at the corners of the carrier to coact with the interior of the housing of the hand-held terminal. This arrangement provides for torsional and beam strength, elastic support of the display, strain relief for TAB and PCB connections, and controlled isotropic deceleration in case of an impact resulting from a fall of the hand-held terminal.

26 Claims, 8 Drawing Sheets

LIQUID CRYSTAL DEVICE WITH AN ISOTROPIC SHOCK MOUNTING AND GASKET

CROSS-REFERENCE TO RELATED APPLICATION

Apparatus For Containing and Supporting Electronic Devices, NCR Docket No. 5770, inventor Robert J. Crockett, U.S. Ser. No. 08/115,300, filed Sep. 1, 1993.

Computer Display Assembly, NCR Docket No. 5772, inventor Robert J. Crockett, U.S. Ser. No. 08/115,299, filed Sep. 1, 1993.

Computer Housing Seal, NCR Docket No. 5787, inventor Robert J. Crockett, U.S. Ser. No. 08/115,376, filed Sep. 1, 1993.

Portable Computer, NCR Docket No. 5671, inventors Donald Carr, Scott Belliveau and Robert Paterson, U.S. Ser. No. 29/012456, filed Sep. 1, 1993.

BACKGROUND OF THE INVENTION

The present invention relates to an isotropic shock mounting system, and more particularly relates to a mechanical system for providing isotropic shock mountings for electronic apparatus such as displays.

The inclusion of such a system in hand-held electronic devices, such as signature capture devices, is important, since such devices are frequently subjected to high G levels when dropped. Current devices frequently do not supply the required level of shock mounting, since the displays of such devices typically fail when the devices are dropped from heights of less than two feet.

The market for portable hand-held electronic products is evolving toward smaller portable terminals. Stringent shock requirements are found, for example, in the package delivery industry. Other applications involving the need for displays in portable devices include retail, field service and other peripheral products.

Current methods of mounting displays or other electronic devices typically provide limited single-axis shock mountings. Such methods are normally capable of protecting displays from limited exposure to low-level mechanical shock. These methods may include mounting a packaged display directly to associated cabinetry without allowing for controlled deceleration, and using multiple pieces of extruded rubber to pinch the display between an associated bezel and carrier.

SUMMARY OF THE INVENTION

The present invention provides five distinct features which are necessary to provide shock mounting for a display or other electronic apparatus. These include torsional and beam strength, elastic support of the display, strain relief for tape automated bonding (TAB) and printed circuit board (PCB) connections, and controlled isotropic deceleration. Such features minimize the likelihood of glass fracture, TAB de-lamination and other mechanical failures which might otherwise occur in the event of a fall, or other mechanical shock to the apparatus. The hardware included in the illustrated embodiment comprises a display, a formed metal bezel, a molded carrier, a shock gasket and a plurality of shock grommets.

Stiffness of the chassis or module containing the display is essential, since displays typically fracture when put in flexure. Beam strength is provided in the illustrated embodiment by a cold formed metal bezel. The carrier has a rib structure on its under side which provides torsional strength. Taken separately, these components would not provide adequate rigidity, but when assembled, they provide the necessary stiffness. After assembly, these two members put the shock gasket, which is located between them, into compression, which holds the display in place.

Elastic support is essential in preventing localized stress and bending. In the illustrated embodiment, this is provided by a single shock gasket which may be molded from an elastic material. The gasket is positioned around all edges of the glass comprising the display that would otherwise come into contact with rigid surfaces of the bezel and the carrier. As previously noted, the shock gasket is put into compression when squeezed between the bezel and the carrier. When the display is subjected to shock, the shock gasket prevents direct contact between the display and the carrier or the bezel. This reduces localized stress and bending of the display. Other implementations may use single strips of silicon to help hold the display.

The shock grommets effectively suspend the entire display chassis or module within the apparatus in which it is contained, and provide controlled deceleration of the module in all directions when it is subjected to mechanical shock in any direction.

The tape automated bonding (TAB) connections connect the printed circuit boards (PCBs) to the glass surface of the display. Strain relief between the TAB connections and the glass and between the TAB connections and the printed circuit boards is provided. In the past, other efforts to strain-relieve the TAB-to-glass connection have used single strips of silicon. This requires multiple components and does not cover the opposite side of the glass with elastic support which causes localized stress build-up during drops.

It is accordingly an object of the present invention to provide a novel and effective isotropic shock mounting system.

Another object is to provide an isotropic shock mounting system which provides, in a hand-held electronic product, torsional and beam strength, elastic support of an electronic component, strain relief and controlled isotropic deceleration.

Another object is to provide a construction for isotropic shock mounting in a hand-held electronic device comprising a bezel, a carrier, a shock gasket and a plurality of shock grommets.

Another object is to provide a novel method for assembly of an isotropic shock mounting system.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION

Figure 1:
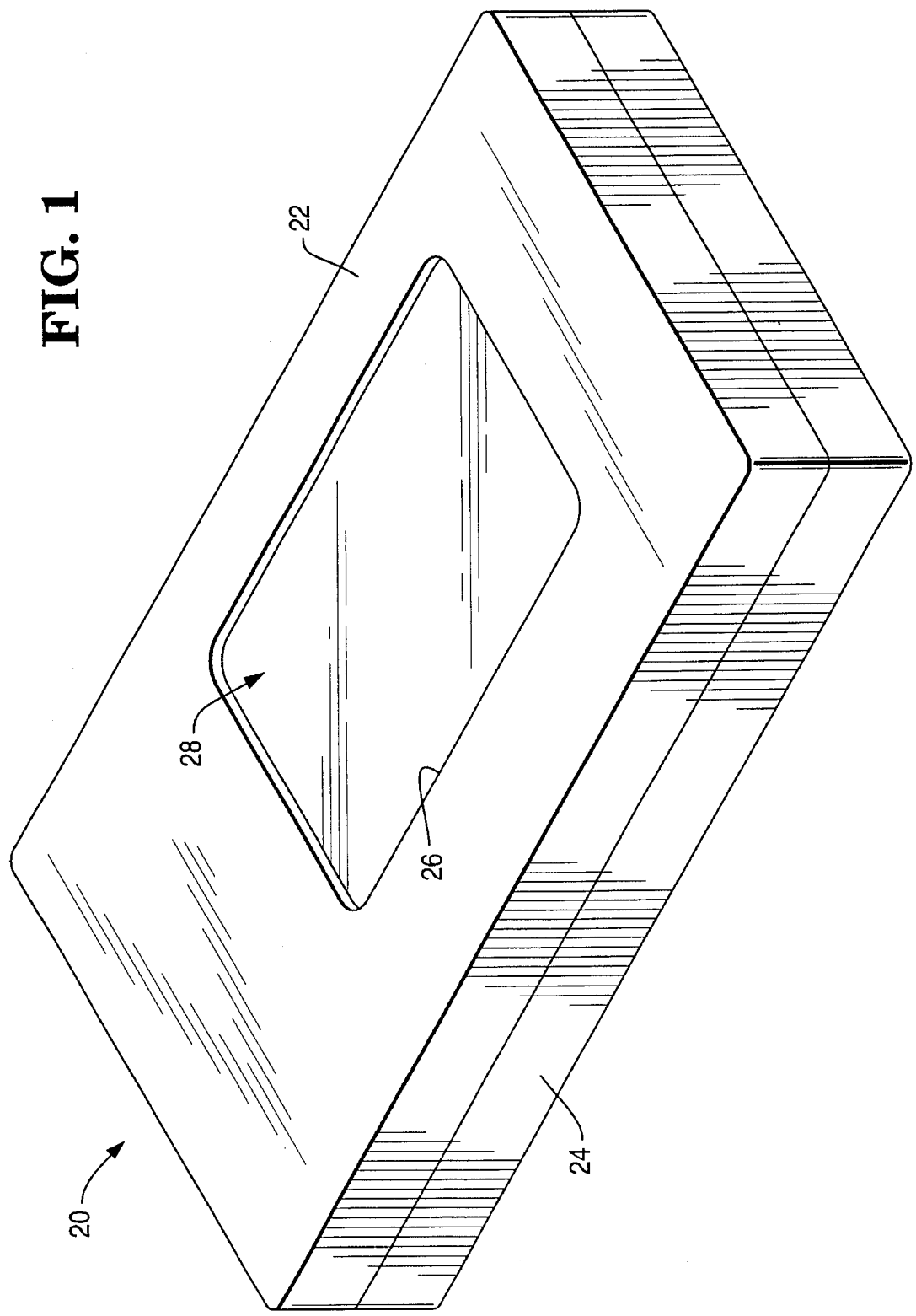
FIG. 1 comprises a perspective view of a hand-held terminal embodying the present invention.
Figure 2:
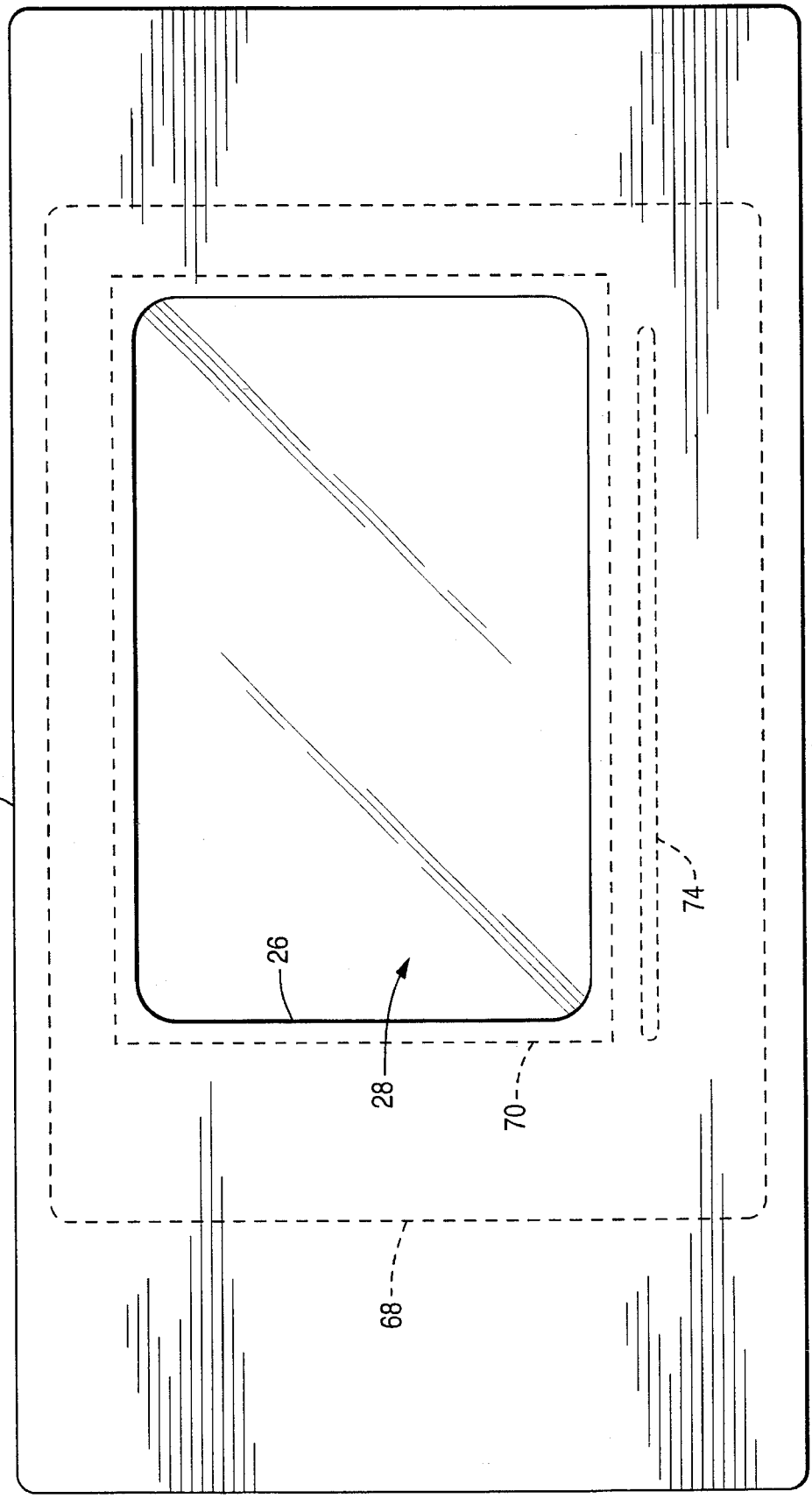
FIG. 2 is a plan view of the upper surface of the hand-held terminal shown in FIG. 1.

Referring now to FIG. 1, shown there is a device, which may be a hand-held business terminal, 20, comprising an upper housing 22 and a lower housing 24. The upper housing 22 includes an aperture 26 through which a display 28 may be viewed. In the illustrated embodiment, the display 28 is a relatively fragile component, and is subject to damage if the business terminal is dropped or otherwise subjected to shock unless the display 28 is protected against such shock by suitable structure within the terminal 20. While the display 28 is shown as the component to be protected in the illustrated embodiment of the present invention, it will be recognized that other types of components subject to damage from shock could also be protected using the teaching of the present invention.

Figure 3:
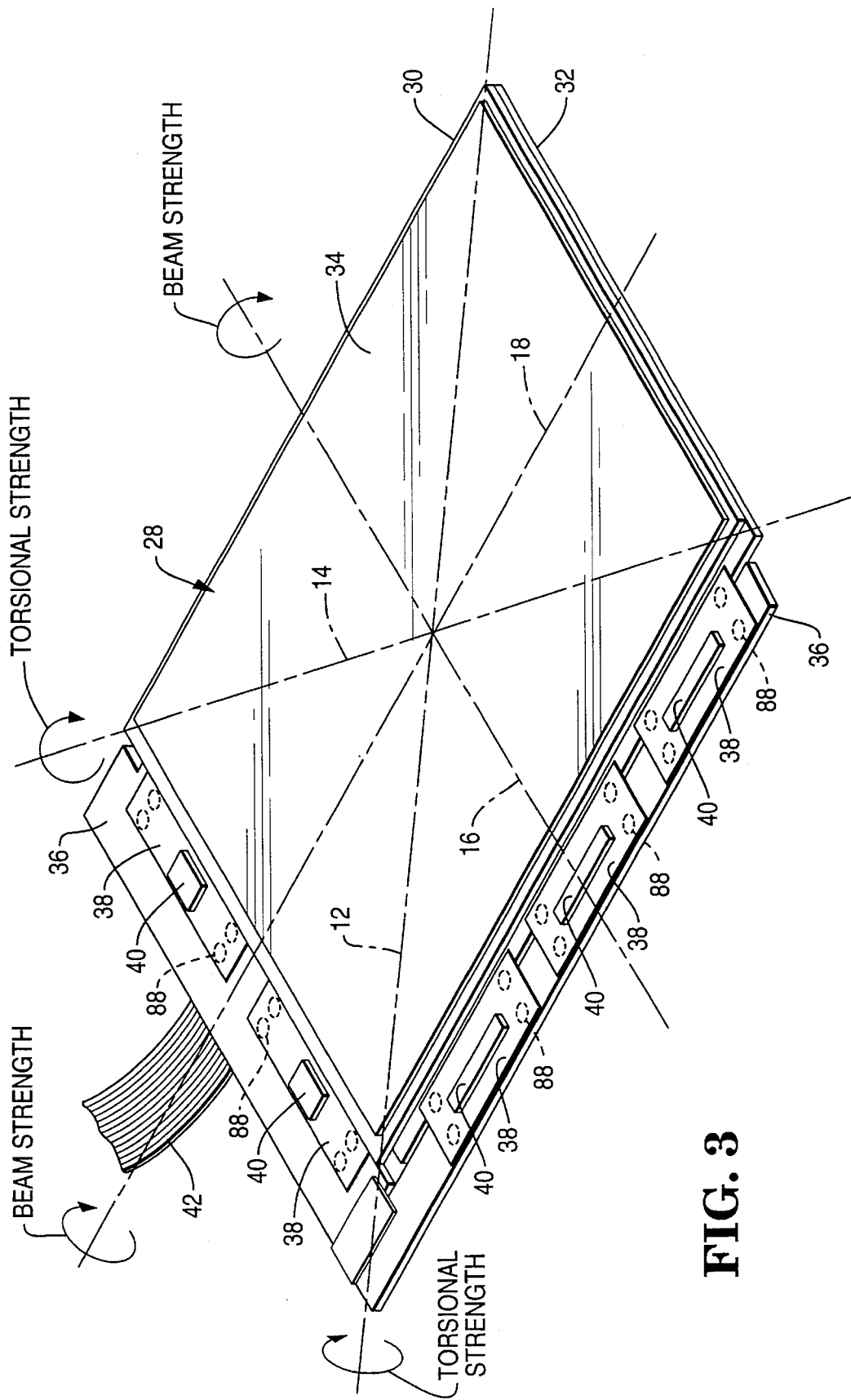
FIG. 3 is a perspective view of the display and associated printed circuit boards and TAB connections.

As shown in greater detail in FIG. 3, the display 28 comprises two panes of glass 30 and 32 which are cemented or otherwise secured together, with a liquid crystal material located in a layer between the two panes of glass. Positioned above the two panes of glass and secured to the upper pane of glass 30 is a layer 34 of polarizing material, which may be made of a suitable plastic. Secured to the lower pane of glass 32 is a backing sheet 33 (FIGS. 8–10) for the display 28. As shown in FIG. 3, the lower pane of glass 32 of the display 28 extends slightly outward of the upper pane of glass 30 to form a base to which a plurality of tape automated bonding (TAB) or other suitable type of connectors 38 may be secured. The TAB connectors electrically couple the display glass panes, with captive liquid crystal material, through suitable connections, to a plurality of printed circuit boards 36, which provide necessary circuitry to operate the display 28. Drivers 40 for driving the display 28 are also mounted on the TAB connectors 38. A cable 42 provides necessary power and data inputs to the display 28.

Figure 5:
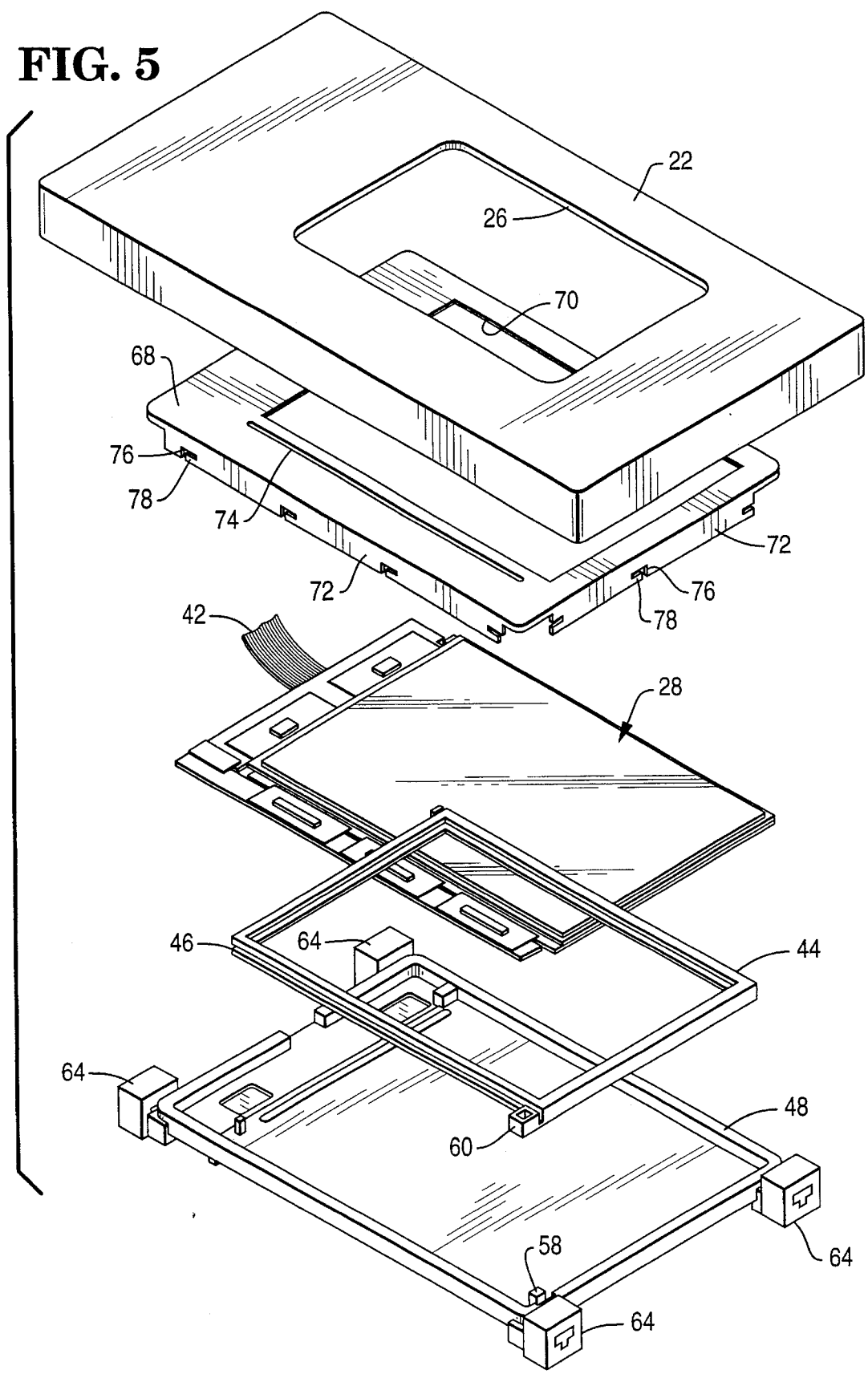
FIG. 5 is an exploded view, showing the upper housing of the hand-held terminal and various components of the shock mounting system.

Shown in FIG. 5 in an exploded view are the various elements of the assembly or module 29 which comprise the shock mounting system which protects the display 28. Cushioned support for the display 28, which is essential in preventing localized stress and bending, is provided by a single shock gasket 44 molded from an elastic material. The gasket 44 is positioned around all edges of the glass of the display which would otherwise come into contact with surfaces of the supporting structure. The gasket 44 is slotted as shown at 46 along two sides to permit the TAB connections 40 and the printed circuit boards 38 to extend therethrough.

Figure 6:
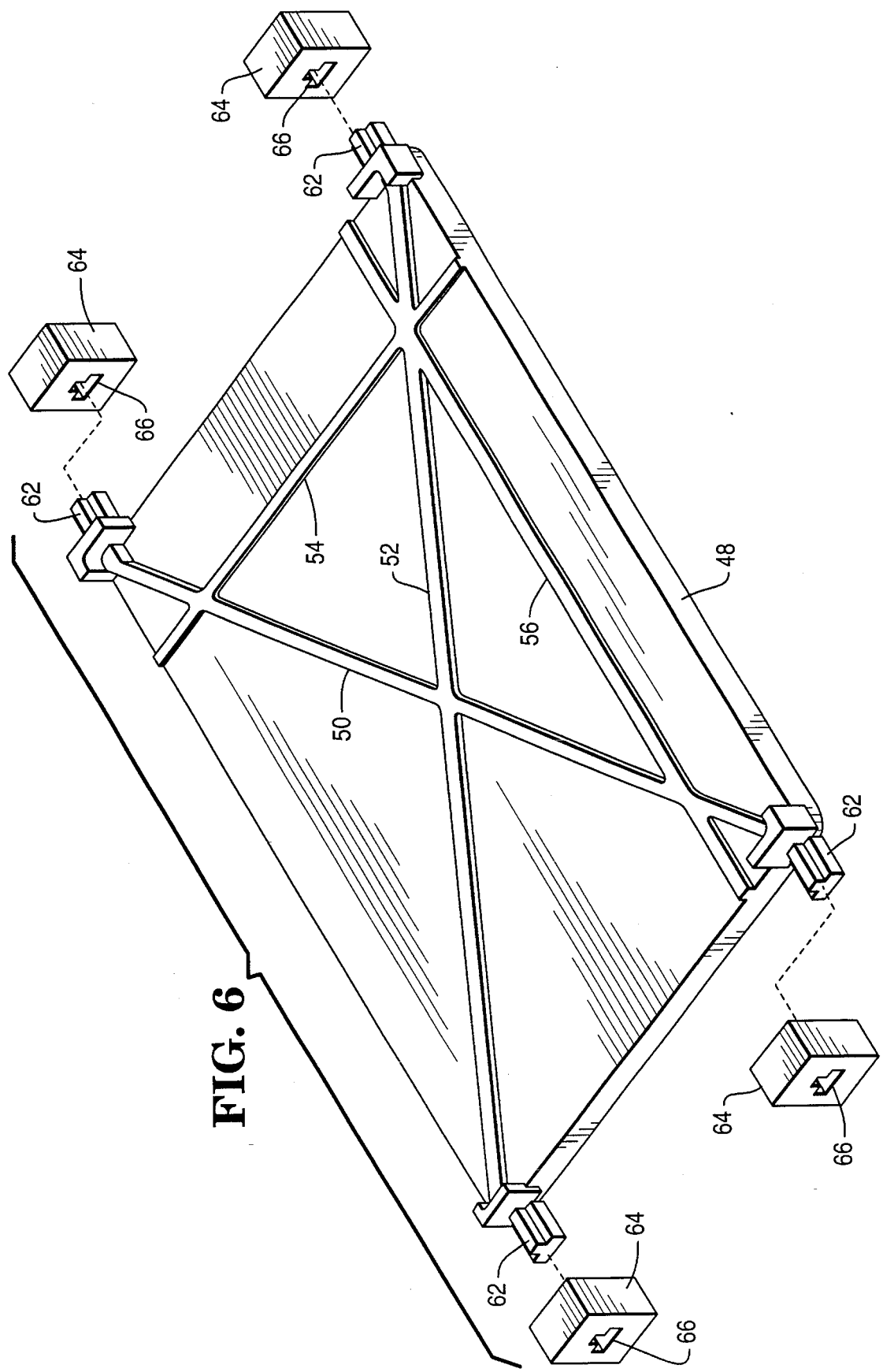
FIG. 6 is a perspective exploded view, viewed from below, showing the carrier and four shock absorbing members which are positioned on projections extending from the carrier.
Figure 7:
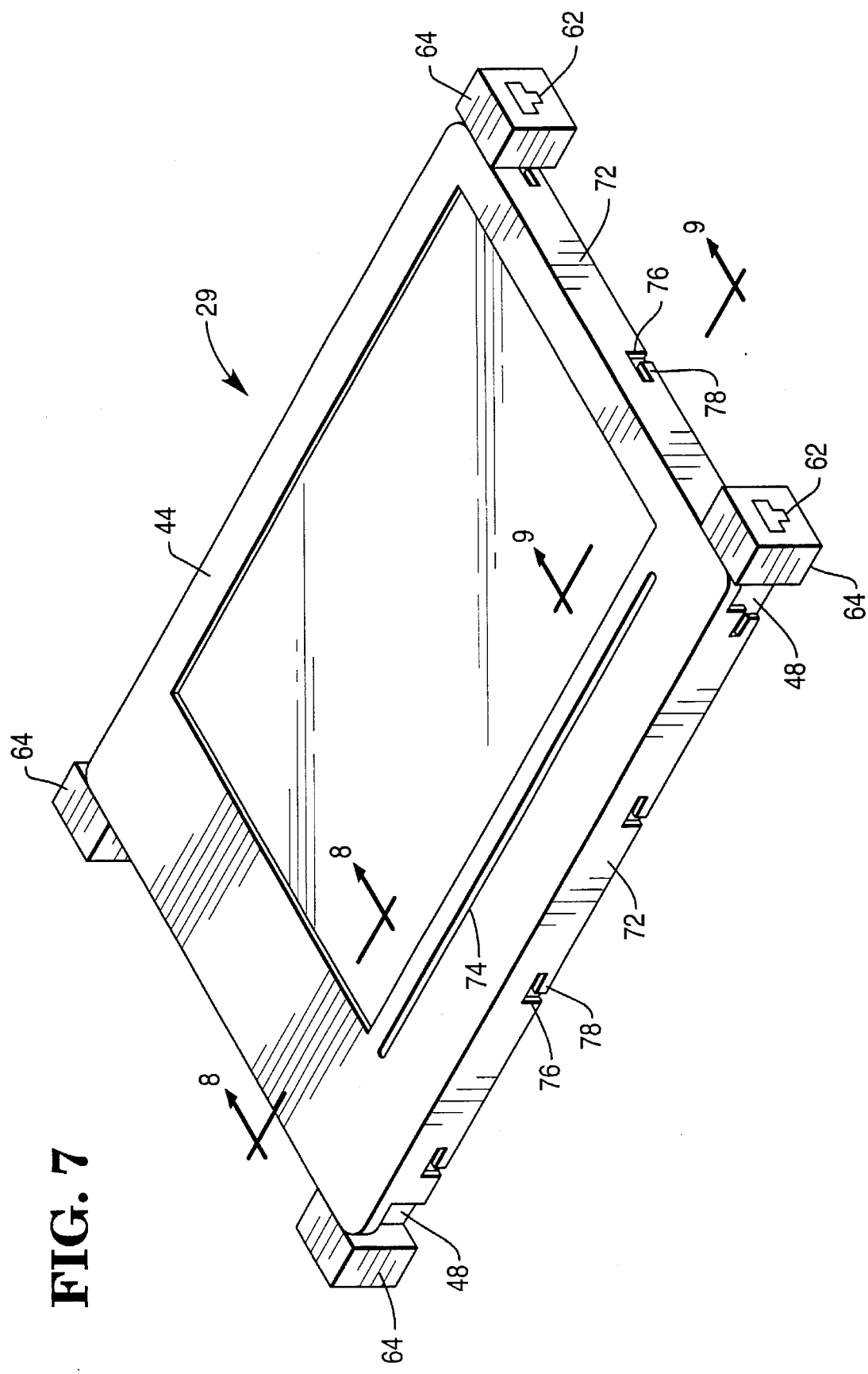
FIG. 7 is a perspective view, showing the carrier and the display mounted within a bezel which forms part of the shock mounting system.

The display 28 with gasket 44 mounted thereon is positioned within a carrier 48 which may suitably be molded from plastic material, and which provides torsional strength to the shock mounting system. The carrier 48 is provided on its underside with a plurality of ribs 50, 52, 54 and 56 (FIG. 6) which are molded into the carrier and which enhance its torsional strength to resist bending of the display 28 along the axes 12 and 14 shown in FIG. 3. A post 58 in one corner of the carrier 48 engages an aperture 60 formed on an extension of the gasket 44 when the display 28 and gasket 44 are positioned within the carrier 48 in order to maintain the parts in proper assembled relation. As best shown in FIG. 6, the carrier 48 also includes a projection 62 at each of its four corners. A shock member or grommet 64 having a suitably shaped aperture 66 therein fits on each of the projections 62. The shock grommets 64 effectively suspend the display within the housing of the terminal 20, controlling deceleration of the display 28 in all directions when subjected to mechanical shock in any direction.

The assembled display 28, gasket 44 and carrier 48 fit within a cold formed metal bezel 68 having an aperture 70 through which the display 28 can be viewed, four downwardly extending walls 72 and a reinforcing groove 74 which compresses gasket 44. The bezel 68 is relatively weak in torsion, since a substantial portion of it is removed to provide a window through the display may be viewed, but provides beam strength to the system to resist bending along the axes 16 and 18 shown in FIG. 3. Cut-outs 76 in the walls 72 define tabs 78 which can be bent inwardly to retain the assembled display 28, gasket 44 and carrier 48 in position within the walls 72 of the bezel 68.

The gasket 44 is put into compression when squeezed between the bezel 68 and the carrier 48. When the terminal 20 is subjected to shock, the shock gasket 44 prevents direct contact between the display 28 and the carrier 48 or the bezel 68, which reduces localized stress and bending of the display.

Figure 4:
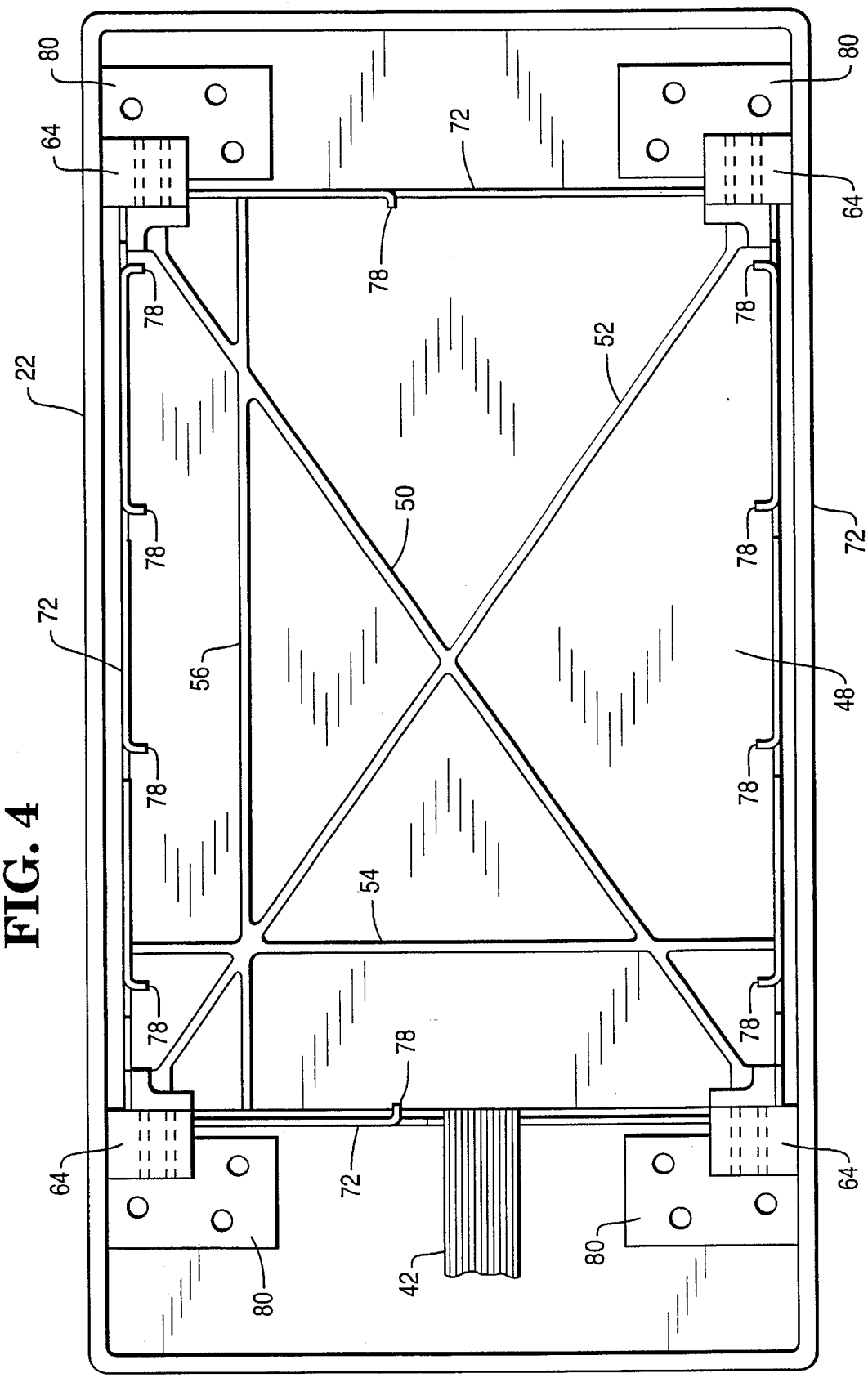
FIG. 4 is a bottom view of the upper portion of the hand-held terminal of FIG. 1, showing the bottom of the carrier of the shock mounting system of the present invention and associated structure.

As best shown in FIG. 4, the upper housing 22 is provided with four seats 80 which are positioned to receive the four shock members 64 when the module 29 comprising the display 28, the gasket 44, the carrier 48, the bezel 68 and the shock members or grommets 64 is placed within the upper housing 22 and retained there by metal plates (not shown). The display 28 is thus suspended in a position in which it is spaced from the walls of the upper housing 22. This suspension of the display 28 permits control of deceleration of the module comprising the display 28, the gasket 44, the carrier 48 and the bezel 68 in all directions when the terminal 20 is subjected to shock in any direction, as by a fall. By varying the composition of the shock members and the distance between the display 28 and the walls of the upper housing 22, the deceleration of the display can be effectively controlled. In the illustrated embodiment of the invention, a clearance of 0.080 inch is provided between the display chassis and the inside surface of the wall of the upper housing 22, which distance is used to decelerate the display chassis.

Figure 8:
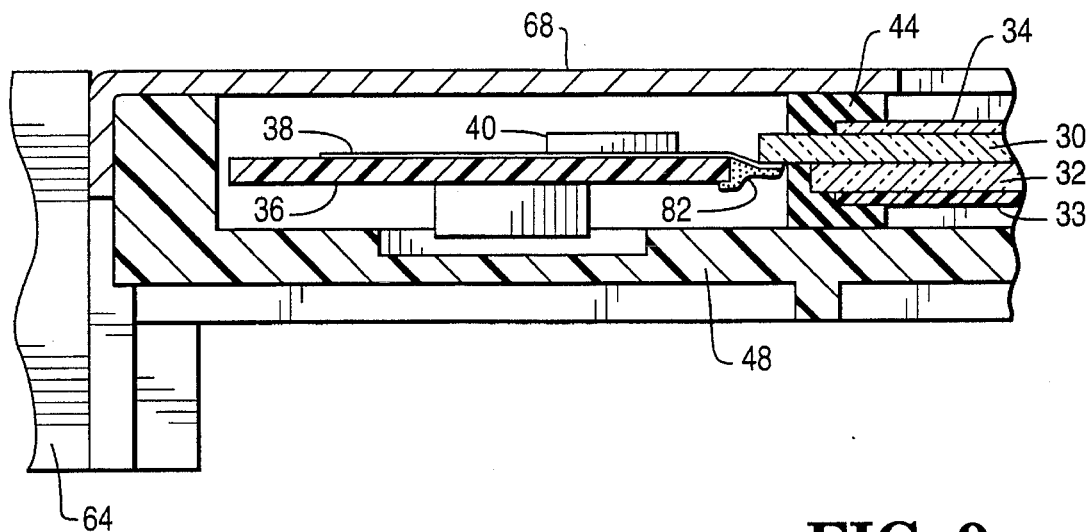
FIGS. 8 and 9 are fragmentary sectional views taken on lines 8—8 and 9—9 of FIG. 7, showing details of the mounting of the display and associated printed circuit boards and TAB connections.
Figure 9:
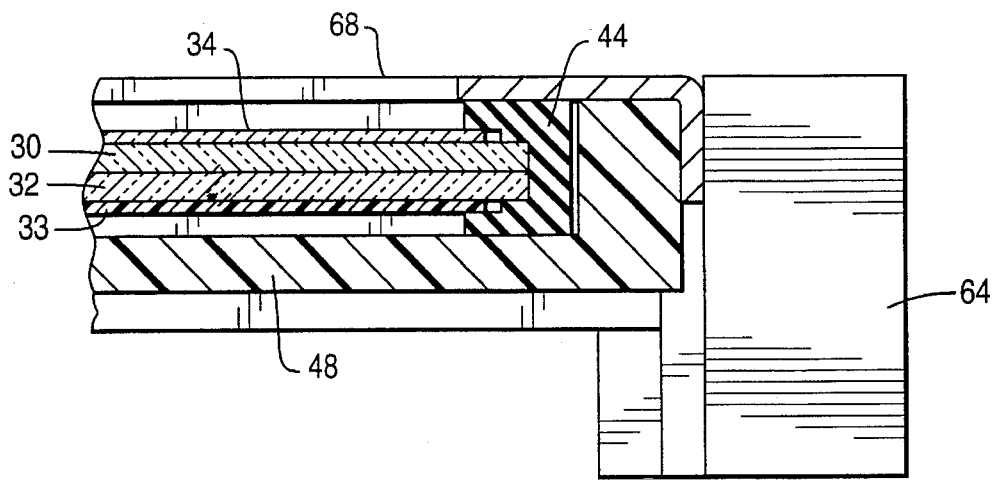
Figure 10:
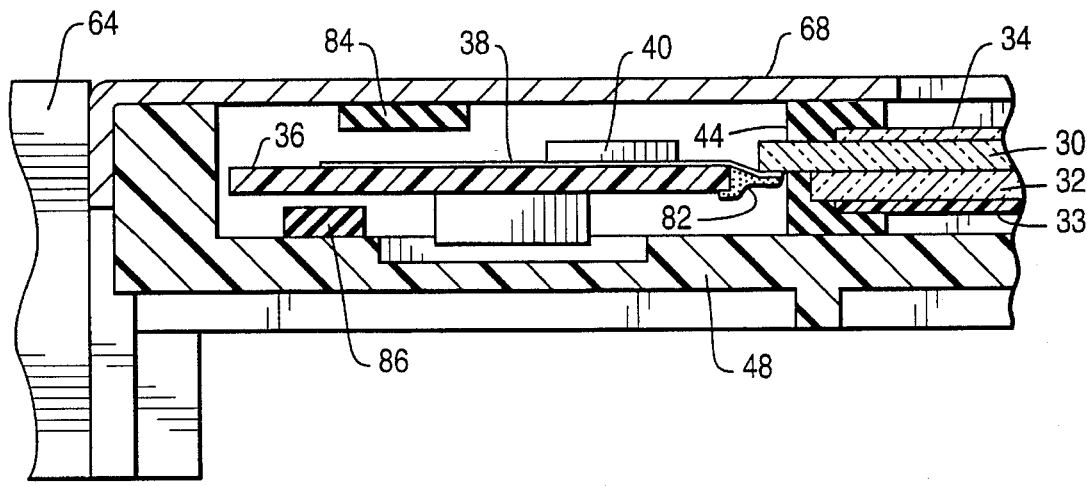
FIG. 10 is a fragmentary sectional view similar to FIG. 8, showing the manner in which additional shock absorbing members may be employed to minimize movement of the printed circuit boards which are connected to the display.

As best shown in FIGS. 8–10, strain relief is provided between the TAB connections 38 and the glass panes 30, 32 of the display 28 and between said TAB connections and the printed circuit boards 36. It is imperative that these connections be strain relieved, because the high G forces developed during a shock loading will otherwise cause the connections to fail. Strain relief between the TAB connections 38 and the glass panes 30, 32 is provided by the shock gasket 44 when it is put into compression between the bezel 68 and the carrier 48. The connection between the TAB connections 38 and the printed circuit boards 36 is strain relieved by using an adhesive/sealant bond 82 (FIG. 8). Alternatively, additional solder pads 88 (FIG. 3), which may not be required from an electrical connection standpoint, may be soldered between the TAB connections 38 and the printed circuit boards 36 to provide additional strain relief. These solder pads 88 should be staggered or located in a multi-line formation, rather than in a single straight line, in order to optimize the strain relief which they provide.

As shown in FIG. 10, if desired, additional shock gaskets 84 and 86 may be positioned between the bezel 68 and the TAB connector 38, and between the carrier 48 and the printed circuit board 36. These additional gaskets help to control the deceleration of the printed circuit board and reduce the stress on the TAB connector.

Although the invention has been described with particular reference to a preferred embodiment thereof, variations and modifications of the present invention can be effected within the spirit and scope of the following claims.

What is claimed is:

1. A shock-resistant assembly, comprising:

a generally planar apparatus having a plurality of edges;

a resilient gasket extending around and receiving the edges of said apparatus;

a carrier for said apparatus into which the apparatus with attached gasket is placed, said carrier having a plurality of projections extending outwardly therefrom;

a bezel into which said apparatus, said gasket and said carrier are placed; and a shock member mounted on each projection and engaging a surface on the interior of a housing into which said assembly is placed, to absorb a shock of sudden impact.

2. The shock-resistant assembly of claim 1, in which the apparatus is a display.

3. The shock-resistant assembly of claim 2, in which said bezel includes a rectangular cut-out portion to enable the display to be viewed.

4. The shock-resistant assembly of claim 1, in which said apparatus is generally rectangular in shape and said resilient gasket is also substantially rectangular in shape and covers edges of the apparatus.

5. The shock-resistant assembly of claim 1, in which assembly is held together by a plurality of elements on the bezel which are turned inwardly to retain the apparatus, the gasket and the carrier within the bezel.

6. The shock-resistant assembly of claim 1, in which said carrier is reinforced in order to increase torsional strength.

7. The shock-resistant assembly of claim 6, in which said carrier is reinforced by providing a plurality of ribs on an exterior surface.

8. The shock-resistant assembly of claim 7, in which said ribs include a plurality of ribs extending diagonally between opposite corners of said carrier and ribs extending parallel to two edges of said carrier.

9. The shock-resistant assembly of claim 1, in which said carrier is molded of plastic material.

10. The shock-resistant assembly of claim 1, in which said bezel is of formed metal.

11. The shock-resistant assembly of claim t, in which the apparatus includes a plurality of connections coupled to the remainder of the apparatus.

12. The shock-resistant assembly of claim 11, in which strain relief is provided for the coupling of the connections to the remainder of the apparatus.

13. The shock-resistant assembly of claim 12, in which shock-absorbing members are provided to limit the movement of the connections.

14. The shock-resistant assembly of claim 12, in which adhesive is applied to the area of coupling of the connections to other portions of the apparatus for the purpose of strain relief.

15. The shock-resistant assembly of claim 11, in which the apparatus includes at least one printed circuit board coupled to a connection.

16. The shock-resistant assembly of claim 15, in which strain relief is provided for the coupling of said at least one printed circuit board to said connection.

17. The shock-resistant assembly of claim 12, in which a plurality of solder pads are provided between said connections and other portions of the apparatus for the purpose of strain relief, said solder pads being located in other than a straight line formation.

18. The shock-resistant assembly of claim 1, in which said resilient gasket is placed in compression between the bezel and the carrier when the assembly is assembled, to hold the electronic apparatus in place.

19. The shock-resistant assembly of claim 1, in which the bezel includes an inwardly extending groove.

20. The shock-resistant assembly of claim 1, in which the resilient gasket is a single element molded from plastic material.

21. The shock-resistant assembly of claim 1, in which said carrier is generally rectangular in shape and one of said projections is present adjacent each corner of the carrier.

22. The shock-resistant assembly of claim 1, in which each of the shock members is of a configuration having six rectangular faces.

23. The shock-resistant assembly of claim 1, in which means are provided for retaining the carrier and the apparatus within the bezel.

24. A method for assembling a shock-resistant assembly for use in a product having a housing, said assembly including an apparatus to be protected, a resilient gasket dimensioned to fit around the periphery of the apparatus, a bezel into which the apparatus is positioned, a carrier for supporting the apparatus and having a plurality of projections, and a plurality of shock members which can be positioned on said projections for minimizing impact shocks to the apparatus, comprising the following steps:

(a) placing the gasket around the periphery of the apparatus;

(b) locating the assembly and gasket in the carrier;

(c) positioning the assembled gasket, apparatus and carrier within the bezel, with the projections extending outside the bezel;

(d) providing retaining means to retain the assembled gasket, apparatus and carrier within the bezel so that the gasket is compressed between the gasket and the carrier;

(e) mounting a shock member on each of the carrier projections; and (f) placing the assembled bezel, gasket, apparatus and carrier in the housing of the product so that the shock members engage the interior of the housing of the product.

25. The method of claim 24, in which the apparatus is a display, and the bezel and the product housing are apertured to permit viewing of the display, and in which steps (c) and (f) include locating the elements of the assembly so that the display is visible to a user of the product.

26. The method of claim 24, in which the bezel includes a plurality of bendable tabs located along one edge thereof, and in which step (d) includes bending said tabs inwardly to engage a surface of the carrier to retain it in assembled position.

* * * * *

UNITED STATES PATENT AND TRADEMARK OFFICE
CERTIFICATE OF CORRECTION

PATENT NO. : 5,479,285
DATED : December 26, 1995
INVENTOR(S) : Randal A. Burke

It is certified that error appears in the above-indentified patent and that said Letters Patent is hereby corrected as shown below:

Column 5, line 65, "t" should be -- 1 --.

Signed and Sealed this

Fourth Day of June, 1996

Attest:

BRUCE LEHMAN

*Attesting Officer*  *Commissioner of Patents and Trademarks*